May 2, 1944.    M. KATCHER    2,347,953
LUBRICANT SEAL
Filed Dec. 13, 1941
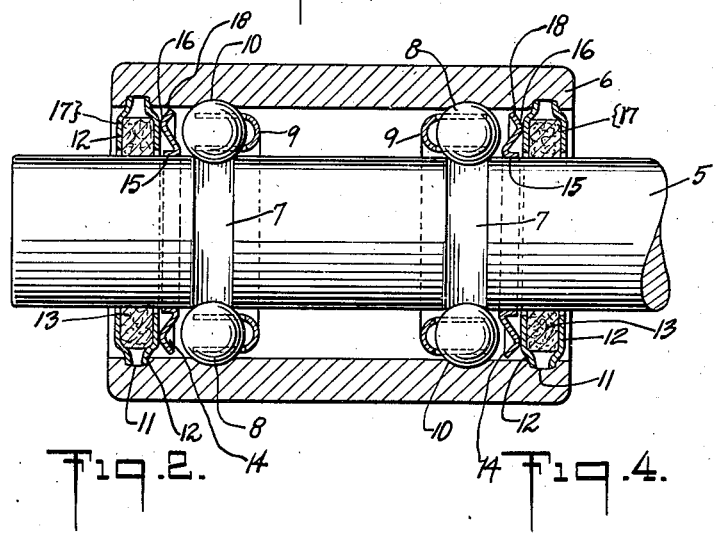
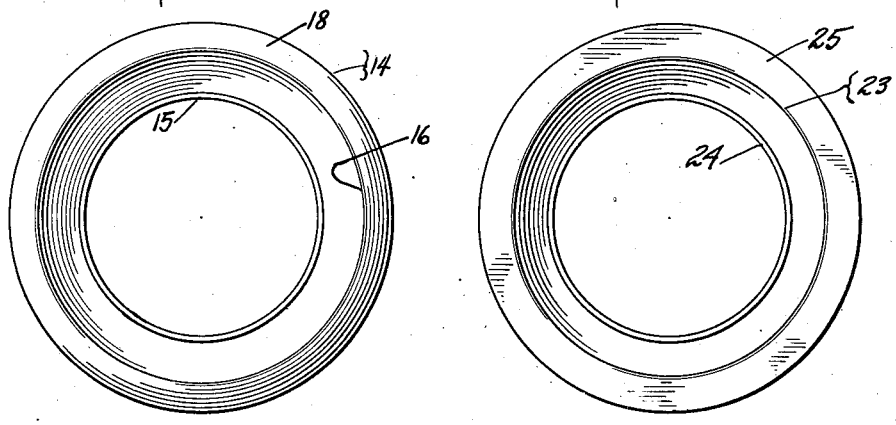
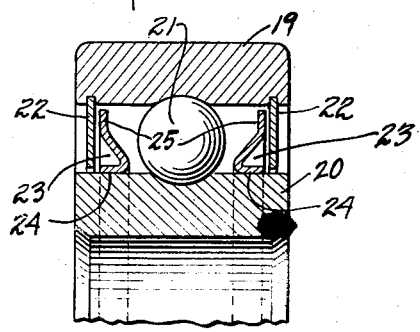
INVENTOR
Morris Katcher
BY
Emanuel Scheyer
ATTORNEY Patented May 2, 1944

2,347,953

UNITED STATES PATENT OFFICE 2,347,953

LUBRICANT SEAL

Morris Katcher, New York, N. Y.

Application December 13, 1941, Serial No. 422,787

3 Claims. (Cl. 286—5)

This invention relates to a lubricant seal especially where one member extends through and rotates within another or outer member or there is relative rotation between the members. The outer member in one form functions as a housing to retain the lubricant, the seal preventing the escape of lubricant where the inner member emerges from the outer. The invention is also especially adapted for ball and roller bearings. It can also be used with thrust bearings. Seals have been used in the art in the form of a ring or slinger washer which is fixed to the outer member, the ring having a running clearance with the inner member which is often a shaft or inner race ring. Undue leakage of lubricant often occurs through said clearance. It is an object of the present invention to prevent substantially or reduce the amount of this leakage. To accomplish this a second ring is provided adjacent the usual sealing ring, said second ring being tight on the inner member and having running clearance with the outer member. Thus in order for the grease to escape it must follow a labyrinthine path. Such a path offers considerable resistance to the flow of the grease, thereby substantially preventing leakage.

Other objects and advantages will become apparent upon further study of the description and drawing in which:

Fig. 1 is a section through a bearing showing one of my sealing rings in section at each end of the bearing.

Fig. 2 is an elevation to a larger scale, looking to the right in Fig. 1, of my sealing ring shown by itself;

Fig. 3 is a partial section through another type of bearing showing another type of my sealing rings in section, and Fig. 4 is an elevation to a larger scale, looking to the right in Fig. 3, of the other type of sealing ring shown by itself.

Referring to Figs. 1 and 2, a ball bearing is shown in which shaft 5 comprises the inner member, and shell 6 the outer member or race ring. Shaft 5 is provided with grooves or raceways 7 in which balls 8 roll, the balls being held in spaced relation by retainer rings 9. Corresponding raceways 10 in shell 6 are provided to raceways 7. Each end portion of shell 6 is provided with a groove 11. Metal washers 12 fit in grooves 11. Between each pair of washers 12 is held a ring 13 of felt or other soft material. Washers 12 have running clearance with shaft 5. Felt ring 13 is pressed into sliding contact with shaft 5. Each pair of washers 12 with their felt ring 13, forming the sealing assembly 17 remains in fixed relation to shell 6. In that type of bearing, as in the case of that shown in Fig. 1, where the shell remains stationary, the sealing assemblies 17 remain stationary. In other types of bearings, where the outer member rotates, sealing assemblies rotate with it. As can readily be understood, wear, where felt ring 13 rubs against shaft 5, will ultimately develop, permitting leakage. In order to keep this down, I have added a ring or washer 14 adjacent each assembly 17 to cooperate with it. In the particular type of washer 14 shown in Figs. 1 and 2, which is my preferred form, I provide an axially extending inner flange 15. Washer 14 has a tight fit on shaft 5. Radially outward from flange 15, a bead 16 is formed on the washer, the latter being preferably so set on shaft 5, that the bead is in sliding contact at its summit with its adjacent washer 12. This results in a line contact between washers 14 and 12, reducing the loss by friction between them as sealing assembly 17 remains stationary with shell 6, and washer 14 revolves with shaft 5. The radially outward portion 18 of each washer 14 is inclined axially inward of the bearing.

As shaft 5 revolves, radially outward pressure is developed in the lubricant. Being unable to escape radially outward or axially inward this pressure tries to relieve itself axially outward. As the lubricant presses outward due to centrifugal force, that portion of it contacting inclined portion 18 of washer 14 is deflected axially inward of the bearing. Whatever grease passes through the clearance between the periphery of washer 14 and shell 6 is stopped from moving axially outward by sealing assembly 17. The grease must then pass radially inward forcing its way past the contact between bead 16 and washer 12. Only after having traveled through this winding path can the lubricant arrive at the contact of felt ring 13 and shaft 5.

The annular ball bearing of Fig. 3 comprises an outer race ring 19 and an inner race ring 20 with balls 21 rolling between them. Flanking the row of balls 21 near each end of the bearing are sealing rings or slinger washers 22 which are carried by outer race ring 19. Sliding clearance is provided between the inner rim of washers 22 and inner race ring 20. Just inside of washers 22, also flanking the row of balls 21 are sealing rings 23 which are tight on inner race ring 20. Each sealing ring 23 has an axially extending flange 24 as before, but no bead is present, the radially outer portion 25 of the ring extending substantially parallel to sealing washer 22 and in sliding clearance therewith.

As before, the outward pressure of the grease tends to force it axially out of the bearing, this flowing being substantially prevented by the winding path it must travel on its way out, namely, axially out past the outer edge of ring 23, radially inward between ring 23 and washer 22 and then axially outward past the inner edge of washer 22.

It is to be noted that both washer 14 and washer 23 are bulged axially above their inner flanges. This provides more springiness for the flanges so that when they are forced on the shaft or race ring they will have a firm grip.

While the drawing shows the seal used in connection with a ball bearing it will be readily understood to be applicable to other types of bearing without the use of balls, so long as the relatively rotable members have a space between them for lubricant. The seal applies also to roller bearings and thrust bearings of the ball or roller type.

I claim:

1. Sealing means for use in a bearing having a pair of members mounted in spaced relation to each other to have relative rotation with respect to each other, the space between the members holding lubricant, said sealing means preventing escape of lubricant from said space and comprising ring means contacting one of said members and extending across said space into closely adjacent relationship with the second of said members, and a sealing washer adjacent said ring means having a flange at one edge extending along the second member in a tight fit therewith and substantially at right angles to the ring means, the web of said washer extending from its flange at the side of the flange away from the ring means, across the space between the members into closely adjacent relationship with the first of said members, said web at its portion adjacent the flange inclining directly from the flange toward the ring means in an axial direction into closely adjacent relationship with the ring means and at its portion toward said first member extending into closely adjacent relationship and substantially parallel to the adjacent portion of the ring means.

2. Sealing means for use in a bearing having a pair of members mounted in spaced relation to each other to have relative rotation with respect to each other, the space between the members holding lubricant, said sealing means preventing escape of lubricant from said space and comprising ring means contacting one of said members and extending across said space into closely adjacent relationship with the second of said members, and a sealing washer adjacent the ring means having a flange at one edge extending along the second member in a tight fit therewith and substantially at right angles to the ring means, the web of said washer extending at an inclination directly from its flange at the side of the flange away from the ring means, the inclination being axially toward the ring means into closely adjacent relationship with the ring means, and radially outward, from the end of said axial inclination, across the space between the members into closely adjacent relationship with the first of said members.

3. Sealing means for use in a bearing having a pair of members mounted in spaced relation to each other to have relative rotation with respect to each other, the space between the members holding lubricant, said sealing means preventing escape of lubricant from said space and comprising ring means in contact at one edge with one of said members and extending across said space into closely adjacent relationship with the second of said members, and a sealing washer adjacent the ring means having one edge in a tight fit with the second member, said washer extending at an inclination directly from said edge, the inclination being radially outward and axially toward the ring means to an intermediate portion of the latter and then inclining in an opposite axial direction and radially outward from said portion into closely adjacent relationship with said first member, said washer being closely adjacent the ring means at said intermediate portion.

MORRIS KATCHER.